United States Patent [19]

Schucker

[11] Patent Number: 5,290,452

[45] Date of Patent: Mar. 1, 1994

[54] CROSSLINKED POLYESTER AMIDE MEMBRANES AND THEIR USE FOR ORGANIC SEPARATIONS

[75] Inventor: Robert C. Schucker, Baton Rouge, La.

[73] Assignee: Exxon Research & Engineering Co., Florham Park, N.J.

[21] Appl. No.: 803,243

[22] Filed: Dec. 5, 1991

[51] Int. Cl.⁵ .............. B01D 61/36; B01D 71/06
[52] U.S. Cl. .................. 210/640; 210/654; 525/437; 528/288; 428/474.4
[58] Field of Search .............. 210/640, 651, 654; 525/437; 528/288

[56] References Cited

U.S. PATENT DOCUMENTS

| 4,081,428 | 3/1978 | Thompson | 260/75 |
|---|---|---|---|
| 4,277,344 | 7/1981 | Cadotte | 210/654 |
| 4,613,440 | 9/1986 | Zupancic et al. | 210/490 |
| 4,654,409 | 3/1987 | Shirai et al. | 528/26 |
| 4,946,594 | 8/1990 | Thaler et al. | 210/651 |
| 4,963,165 | 10/1990 | Blume et al. | 55/16 |
| 4,990,275 | 2/1991 | Ho et al. | 252/62.3 |
| 5,039,422 | 8/1991 | Schucker | 210/651 |
| 5,049,281 | 9/1991 | Schucker | 210/640 |

FOREIGN PATENT DOCUMENTS

| 0339391 | 11/1989 | European Pat. Off. | 5/18 |
|---|---|---|---|
| 2325675 | 10/1978 | France | 69/44 |
| 9020239 | 2/1974 | Japan . | |
| 2097980 | 5/1987 | Japan . | |
| 2114628 | 5/1987 | Japan . | |
| 2265956 | 10/1990 | Japan . | |

Primary Examiner—Patricia A. Short
Attorney, Agent, or Firm—Joseph J. Allocca

[57] ABSTRACT

The present invention is directed to a polyester/amide membrane, its preparation and its use for organic liquid separation. The polyester/amide membrane is made by reacting a dianhydride with a polyester diol in a 2:1 to 1.05:1 mole ratio to end cap the diol to produce a prepolymer which is reacted with excess thionyl chloride to convert all of the unreacted anhydride and all carboxylic acid groups to acid chloride groups. The resulting acid chloride derivative is dissolved in organic solvent and interfacially reacted with a diamine dissolved in an aqueous solvent. The excess solutions are removed and the resulting thin film membrane is dried. The membranes are useful for organic liquid separations, especially the separation of aromatic hydrocarbons from mixtures of same with non-aromatic hydrocarbons, preferably under perstraction or pervaporation conditions.

3 Claims, No Drawings

CROSSLINKED POLYESTER AMIDE MEMBRANES AND THEIR USE FOR ORGANIC SEPARATIONS

BACKGROUND OF THE INVENTION

1. Field of the Invention

The present invention is directed to crosslinked interfacially polymerized polyester amide membranes, their preparation and use in organic liquid separations.

The membrane is prepared by producing a prepolymer by reacting a dianhydride (or its corresponding tetra-acid or di acid-diester) preferably dianhydride or its corresponding tetra-acid with a polyester diol in a 2:1 to 1.05:1 mole ratio of anhydride or carboxylic acid group to polyester hydroxyl groups. The resulting prepolymer is then reacted with excess thionyl chloride which converts all unreacted anhydride groups and carboxylic acid groups of the prepolymer to acid chloride groups. This acid chloride derivative is dissolved in an organic solvent and reacted interfacially with a diamine dissolved in an aqueous solvent. The organic and aqueous solutions can be just floated one over the other to create an interface or a substrate can be wash coated with one or the other of the solutions, drained, then wash coated with the complementary solution. In either case a membrane forms at the interface between the organic and aqueous solutions due to reaction between the diamine and the acid chloride capped prepolymer. Upon completion of the reaction, the formed membrane is dried at between about 50° to 150° C., preferably 80°-120° C., most preferably about 80°-100° C.

The resulting membrane is useful for organic liquid mixture separations such as the separation of aromatic hydrocarbons from mixtures of same with non-aromatic hydrocarbons; the separation of isoparaffins from mixtures of same with n-paraffins; the separation of olefins from mixtures of same with paraffins; the separation of oxygenates such as mixtures of ethers and alcohols, e.g., methyl tert butyl ether/methanol etc., under pervaporation or perstraction conditions, preferable pervaporation conditions.

2. Discussion of the Related Art

U.S. Pat. No. 4,277,344 describes interfacially synthesized reverse osmosis membranes. The membranes are made from crosslinked interfacially polymerized aromatic polyamides, particularly poly(arylene-polyamine aromatic-polycarboxylamides) such as poly (phenylenediamine trimesamide). The aromatic polyamides are preferably synthesized directly from an essentially monomeric polyacylhalide (at least tri- or higher in acyl functionality) and an essentially monomeric arylene polyamine with a measurable water solubility. A porous support layer is coated with the polyamine component (e.g., an aqueous solution of phenylene diamine); the thus-coated support is contacted with the polyacyl halide component (e.g., trimesoyl chloride), thereby initiating the interfacial polymerization in-situ on the support. The resulting membrane is dried to provide a composite membrane comprising the polyamide laminated to the porous support. The membranes are used for the reverse osmosis desalination of aqueous solutions.

U.S. Pat. No. 4,946,594 describes a crosslinked copolymer composition in which the copolymer is derived from an aliphatic polyester diol, a dianhydride and a diisocyanate crosslinking agent. The resulting membrane is useful for separating aromatic hydrocarbons from mixtures of same with non-aromatic hydrocarbons.

U.S. Pat. No. 4,990,275 relates to a copolymer composition comprising a hard segment of a polyimide and a soft segment of an oligomeric aliphatic polyester. Membranes made from the copolymer are useful for aromatic/saturates separations. The polyimide is derived from a dianhydride having between 8 an 20 carbons and a diamine having between 2 and 30 carbons while the oligomeric aliphatic polyester is a polyadipate, polysuccinate, polymalonate, polyoxalate or polyglutarate.

U.S. Pat. No. 5,049,281 is directed to a multi-block copolymer, the membrane made from such copolymer and the use of the membrane for separation. The multi-block copolymer can comprise a first prepolymer made by reacting a diamine with an epoxy in a diamine to epoxy mole ratio of 2.0 to 1.05 resulting in a diamine end capped prepolymer which is then chain extended with a second compatible prepolymer which can be a dianhydride or its corresponding tetra acid or diacid-diester combined with a polyester in a dianhydride to polyester mole ratio of about 2.0 to 1.05. In the text it is stated that if the diacid-diester or tetraacid derivative of the dianhydride is used they must first be converted to species that will react with diamines or polyesters. This can be done by conversion of the tetra-acid or diacid-diester into an acid chloride by derivatization using thionyl chloride. If this acid chloride is reacted with a diamine an amide acid is formed which when heated or chemically cyclized forms an imide. If the acid chloride is reacted with a polyester the product which results is itself an ester which requires no further curing. This patent, however, does not teach the formation of an interfacially polymerized membrane or the use of such a membrane for separations.

See also U.S. Pat. No. 5,039,422.

DETAILED DESCRIPTION OF THE INVENTION

A polyester/amide membrane is described made by reacting a dianhydride (or its corresponding diacid-diester) preferably the dianhydride or its corresponding tetra-acid with a polyester diol in a 2:1 to 1.05:1 mole ratio to produce an end-capped prepolymer. The resulting endcapped prepolymer is then reacted with excess thionyl chloride to convert all unreacted anhydride and all carboxylic-acid groups into acid chloride groups. The resulting acid-chloride derivative is dissolved in organic solvent that is substantially immiscible with water and interfacially reacted with a diamine dissolved in an aqueous solvent. The membrane is prepared by permitting the organic and aqueous solutions to just float over each other, the membrane forming at the interface of the aqueous and organic solvent layers. Alternatively a microporous support layer may be dipped or wash coated with either the organic solvent solution or aqueous solvent solution. Excess was coat is drained off and the support layer is then wash coated or dipped in the complimentary solution, a membrane resulting at the interface between the organic and aqueous solutions. The reaction proceeds quite rapidly. The resulting membrane is dried at between about 50°-150° C., preferably between about 80°-120° C., most preferably between about 80°-100° C.

The polyester/amide is made by first endcapping a polyester diol with a dianhydride (or the corresponding tetra acid or diacid-diester).

The polyester components are prepared from aliphatic or aromatic diearboxylic acids and aliphatic or aromatic dialcohols. Aliphatic dicarboxylic acids refer to those materials having the general formula HOOCR—COOH where R contains 2 to 10 carbons (and may be either a straight or branched chain configuration). Aromatic dicarboxylic acids refer to those materials having the general structure HOOCRCOOH where R is:

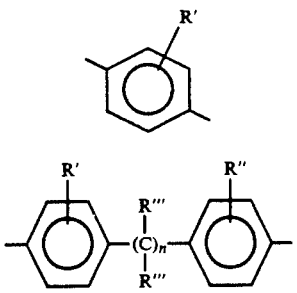

wherein R', R", and R"' may be the same or different and are selected from the group consisting of H and $C_1$-$C_5$ carbons or $C_6H_5$ and combinations thereof, and n is 0 to 4. It is to be understood that in the above formula each R' or R" may itself represent a mixture of H, $C_1$-$C_5$ or $C_6H_6$.

Dialcohols have the general structure HOROH where R may be

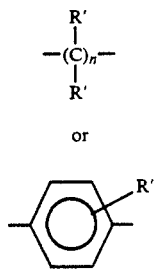

or

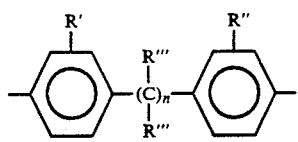

where n is 1 to 10, preferably 4 to 6, and R' is H, $C_1$ to $C_5$ or $C_6H_5$ or

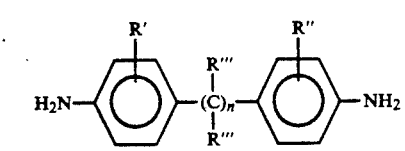

where R', R", R"' and n are defined in the same manner as for the aromatic dicarboxylic acids. An example of a useful dialcohol is bisphenol A.

Representative polyester diols are polyadipate, polysuccinate, polymalonate, polyoxylate, polyglutarate e.g., polyethylene adipate, polyethylene succinate, polyethylene malonate, polyethylene oxylate, polyethylene glutarate, etc. The polyester diols have molecular weight in the range 500 to 4000.

One mole of polyester diol is reacted with between 1.05 and 2 moles of a dianhydride or its corresponding tetra acid or diacid-diester.

Any aromatic, aliphatic, cycloaliphatic or alkylaromatic dianhydride can be used. Examples of dianhydrides include by way of example and not limitation: pyromellitic dianhydride, 3,3',4,4'-benzophenone tetracarboxylic dianhydride, 4,4'-(hexafluoroisopropylidene)-bis-(phthalic anhydride), 4,4'-oxydiphthalic anhydride, diphenylsulfone-3,3',4,4'-tetracarboxylic dianhydride, and 3,3',4,4'-biphenyltetracarboxylic dianhydride. Dicarboxylic acid/diester and tetracarboxylic acid derivatives of dianhydrides can also be used but are not the preferred route.

The polyester and the dianhydride can be reacted neat, that is, in the absence of any added solvent, provided either or both of said reactants are in the liquid or melt form. Alternatively an added solvent can be utilized. Suitable solvents are polar aprotic solvents such as dimethylformamide (DMF), N-methyl pyrrolidone (NMP), dimethylacetamide (DMAc), dimethylsulfoxide (DMSO), tetrahydrofuran (THF), etc.

The resulting dianhydride end capped polyester is then reacted with an excess of thionyl chloride, $PCl_3$ or $PCl_5$, preferably thionyl chloride to convert unreacted anhydride group and all carboxylic acid groups into acyl chloride.

The resulting acid chloride derivative is dissolved in an appropriate organic solvent that is substantially immiscible with water such as toluene, benzene, xylene, chlorinated hydrocarbons (e.g. methylene chloride, chloroform, carbon tetrachloride, etc.).

The acid chloride derivative in solvent solution can, in most cases simply be a saturated solution.

Generally, the concentration of acid chloride derivative in the solvent can range from 0.001 to 5% by weight, preferably 0.05 to 0.5% by weight.

In forming the membrane the layers of organic solution of the acid chloride derivative and of the aqueous solution of a diamine or diamine derivative are permitted to float on each other. Which layer is on the top or the bottom depends on the density of the particular solutions involved. Thus if the organic solvent solution is made employing toluene, it will float on the aqueous diamine solution. Conversely, if chlorinated hydrocarbons are used on the organic solvent, the aqueous diamine solution, being less dense, will float on top of the organic solvent solution.

Diamines which can be used have the general formula $H_2NRNH_2$ where R includes aliphatic and aromatic moieties, such as $$-(C)_n-$$
with R' substituents where n is 1 to 10 and R' may be the same or different and are selected from the group consisting of H, $C_1$-$C_5$ carbons and $C_6H_5$ and mixtures thereof.

Also included are diamines of the formula:

$$H_2N-\text{Ar}-(C)_n-\text{Ar}-NH_2$$

where R', R" and R"' are the same or different and are selected from the group consisting of H or Cl or a $C_1$ to $C_5$ and mixtures thereof and n ranges from 0 to 4.

Non-limiting examples of diamine include phenylene diamine, polyethyleneimine, polyvinyl amine, polyvinyl anilines, polybenzylamines, polyvinyl-imidazolenes, amine modified polyepihalohydrine and other amine containing polymers, triaminobenzene piperazine, piperidine, 2,4-bis(p-aminobenzyl)aniline, cyclohexane diamine, cycloheptane diamine, methylene dianiline (MDA), methylene di-o-chloroaniline (MOCA), methylene bis (dichloroaniline) (tetrachloro MDA), methylene dicyclohexylamine ($H_{12}$-MDA), methylene dichlorocyclohexylamine ($H_{12}$-MOCA), methylene bis (dichlorocyclohexylamine) (tetrachloro $H_{12}$-MDA), 4,4'-(hexafluoroisopropylidene)-bisaniline (6F diamine), 3,3'-diaminophenyl sulfone (3,3'DAPSON), 4,4'-diaminophenyl sulfone (4,4'DAPSON), 4,4'-dimethyl-3,3, diaminophenyl sulfone sulfone (4,4'-dimethyl-3,3'DAPSON), 2,4-diamino cumene, methyl bis(di-o-toluidine), oxydianiline (ODA), bisaniline A, bisaniline M, bisaniline P, thiodianiline, 2,2-bis[4-(4-aminophenoxy)phenyl] propane (BAPP), bis[4-(4-aminophenoxy phenyl) sulfone (BAPS), 4,4'-bis(4aminophenoxy) biphenyl (BAPB), 1,4-bis(4-aminophenoxy) benzene (TPE-Q), and 1,3-bis(4-aminophenoxy) benzene (TPE-R) and mixtures thereof.

The diamine is used as an aqueous solution at a concentration of 0.001 to 5 wt % diamine in water, preferably 0.05 to 0.5 wt % diamine in water.

As previously stated, the membranes can be formed by simply floating a layer of the chloride derivative solution over a layer of the diamine solution or vise versa depending on solution densities. A membrane forms at the interface. The resulting membrane is very thin and may be difficult to handle.

Alternatively the membrane is made on a support backing. Support backings are generally ultrafiltration membranes with pore sizes in the range 0.005 to 0.05 micron and are composed of generally insoluble polymers such as nylon 6/6, cellulose, polyester, teflon, polypropylene, polyethylene, polysulfone, etc. and even non-polymeric supports such as ceramic, sintered glass or metal can be used.

Following formation of the thin, interfacially polymerized membrane the excess solvent solution is drained off and the membrane is dried at between 50°–150° C., preferably between about 80°–120° C., most preferably between about 80°–100° C. to drive off any excess solvent and promote crosslinking of any unreacted amine. Drying is performed for from 1 to 120 minutes, preferably 1 to 20 minutes.

The concentrations of components used and drying/crosslinking times and temperatures selected from the above ranges will be selected by the practitioner in response to the membrane preparation procedures actually employed and the equipment used.

Separations using these membranes can be run under perstraction or pervaporation conditions, preferably pervaporation conditions.

Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams), the aromatic molecules present in the feedstream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$–$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

Pervaporation, by comparison, is run at generally higher temperatures than perstraction with the feed in either liquid or vapor form and relies on vacuum or a sweep gas on the permeate side to evaporate or otherwise remove the permeate from the surface of the membrane and maintain the concentration gradient driving force which drives the separation process. As in perstraction, the aromatic molecules present in the feed dissolve into the membrane film, migrate through said film and reemerge on the permeate side under the influence of a concentration gradient. Pervaporative separation of aromatics from saturates can be performed at a temperature of about 25° C. for the separation of benzene from hexane but for separation of heavier aromatic/saturate mixtures, such as heavy cat naphtha, higher temperatures of at least 80° C. and higher, preferably at least 100° C. and higher, more preferably 120° C. and higher (up to about 170° to 200° C. and higher) can be used, the maximum upper limit being that temperature at which the membrane is physically damaged. Vacuum on the order of 1–50 mm Hg is pulled on the permeate side. The vacuum stream containing the permeate is cooled to condense out the permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the internal space of the tube or fiber, the other material obviously being on the other side. Utilization of the present membrane as tubes and hollow fibers must, obviously involve the use of a preformed tube or hollow fiber support which is serially wash coated with the appropriate solutions to produce a supported composite membrane of interfacially polymerized membrane on the support backing.

Most conveniently for perstraction, the membrane is used in a hollow fiber configuration with the feed introduced on the exterior side of the fiber, the sweep liquid flowing on the inside of the hollow fiber to sweep away the permeated highly aromatic species, thereby maintaining the desired concentration gradient. The sweep liquid, along with permeate contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering the temperature.

The membrane are useful for the separation of aromatics from non-aromatics in petroleum and chemical streams, and have been found to be particularly useful for the separation of larger, substituted aromatics from non-aromatics as are encountered in heavy cat naphtha streams. Other streams which are also suitable feed streams for aromatics from saturates separation are intermediate cat naphtha streams (200°-320° F.), light aromatics content streams boiling in the $C_5$-300° F. range, light catalytic cycle oil boiling in the 400°-650° F. range, reformate streams as well as streams in chemical plants which contain recoverable quantities of benzene, toluene, xylene or other aromatics in combination with saturates.

Additional separations which are contemplated are isoparafin/n-paraffin separation, olefin/paraffin separation, oxygenate (e.g. ether/alcohol) separation such as MTBE/MeOH separation etc.

The present invention is illustrated in the following non-limiting examples.

EXAMPLE 1

Approximately 19.54 grams (0.01 mole) of polyethylene adipate were added to 4.36 grams (0.02 mole) pyromellitic dianhydride in a round bottom flask equipped with a mechanical stirrer and reflux condenser. The flask was placed in an oil bath at 140° C. for 1 hour with stirring to produce the anhydride end-capped polyester prepolymer. The flask was then removed from the bath, cooled slightly and 14 grams (0.12 moles) thionyl chloride were added with stirring. The flask contents were then heated to 60° C. for 1 hour after which the flask was cooled and the thionyl chloride removed by nitrogen stripping followed by evacuation to 1 torr at 60° C. The final product was a light brown semi-solid which was easily removed from the flask.

EXAMPLE 2

Approximately 0.2 grams of the acid-chloride derivative from Example 1 were mixed with 30 grams toluene to form a dilute solution. In a separate bottle, distilled water was saturated with methylene dianiline (MDA) at 25° C. A sheet of microporous Teflon was placed in a coating cell and covered with a layer of the aqueous diamine solution (approximately ⅛" thick). The toluene solution of acid-chloride derivative was then placed carefully on the top of the aqueous layer at which time the reaction occurred so fast that a film almost immediately covered the surface. Additional toluene solution was added to cover completely. After 1 minute, the water layer was drained off through a side tube allowing the interfacially made film to float down onto the Teflon surface. The excess toluene liquid was then siphoned off and the surface was carefully rinsed with fresh toluene. After air drying at room temperature, the membrane was finally dried at 80° C. for 10 minutes.

EXAMPLE 3

A second membrane was made as in Example 2 except that the process was carried out twice. That is, the first film was made and dried at 80° C.; and a second interfacial polymerization was carried out depositing a second film on the first, resulting in a thicker film.

EXAMPLE 4

The membrane from Example 3 was placed in a pervaporation cell having 5.07 cm² area. Feed to the cell consisted of 10 wt % toluene, 40 wt % p-xylene, 20 wt % isooctane and 30 wt % n-octane. Feed was passed over the membrane at approximately 1 cc/min, the cell was heated to operating temperature and a 0.1 torr vacuum was pulled on the downstream side of the membrane. Samples were collected in a cold trap as a function of time to determine their weight and then analyzed for composition by gas chromatography. Results of the testing are shown in Table 1.

TABLE 1

| Temperature (°C.) | Selectivity | | | | Flux (Kg/m²/d) |
|---|---|---|---|---|---|
| | Tol/i-$C_8$ | Tol/n-$C_8$ | Xyl/i-$C_8$ | Xyl/n-$C_8$ | |
| 50 | 15.1 | 8.4 | 9.6 | 5.3 | 11.2 |
| 90 | 13.0 | 6.8 | 8.5 | 4.5 | 89.9 |

What is claimed is:

1. A method for separating mixtures of organic liquids into their components said separation process comprising contacting the organic liquid mixture to be separated into its components with one side of a crosslinked polyester amide interfacially polymerized membrane made by the process comprising reacting a dianhydride or its corresponding tetra-acid or diacid-diester with a polyester diol in a 2:1 to 1.05:1 mole ratio of anhydride or carboxylic acid groups to polyester hydroxyl groups, to produce an endcapped prepolymer, reacting the endcapped prepolymer with excess thionyl chloride to convert all unreacted anhydride or carboxylic acid groups into acid chloride groups, dissolving the resulting acid chloride derivative in an organic solvent that is substantially immiscible with water, dissolving a diamine in water to produce an aqueous diamine solution contacting the aqueous diamine solution with the acid-chloride derivative organic solvent solution so that the organic and aqueous solutions float one upon the other with an interface between them whereby the membrane forms at said interface due to the reaction between the diamine and acid chloride capped prepolymer in the respective solutions drying the membrane at between 50° to 150° C. for from 1 to 120 minutes, said separation process being conducted under pervaporation or perstraction conditions.

2. A method for separating mixtures of organic liquids into their components, said separation process comprising contacting the organic liquid mixture to be separated into its components with one side of a supported crosslinked polyester amide interfacially polymerized membrane made by the process comprising reacting a dianhydride or its corresponding tetra-acid or diacid-diester with a polyester diol in a 2:1 to 1.05:1 mole ratio of anhydride or carboxylic acid groups to polyester hydroxyl groups, to produce an endcapped prepolymer, reacting the endcapped prepolymer with excess thionyl chloride to convert all unreacted anhydride or carboxylic acid groups into acid chloride groups, dissolving the resulting acid chloride derivative in an organic solvent that is substantially immiscible with water, dissolving a diamine in water to produce an aqueous diamine solution contacting the aqueous diamine solution with the acid-chloride derivative organic solvent solution so that the organic and aqueous solutions float one upon the other with an interface between them whereby the membrane forms at said interface due to the reaction between the diamine and acid chloride capped prepolymer in the respective solutions drying the membrane at between 50° to 150° C. for from 1 to 120 minutes, said separation process being conducted under pervaporation or perstraction conditions.

3. The separation process of claim 1 or 2 wherein the organic liquid mixture being separated is selected from the mixture groups consisting of (a) mixtures of aromatics and non-aromatics, (b) mixtures of isoparaffins and normal paraffins, (c) mixtures of olefins and paraffins, (d) mixtures of ethers and alcohols.

* * * * *